US008627634B2

(12) United States Patent
Kölzer et al.

(10) Patent No.: US 8,627,634 B2
(45) Date of Patent: Jan. 14, 2014

(54) CASEMENT FOR A GLASS WINDOW OR LEAF FOR A GLASS DOOR, WINDOW OR DOOR FRAME AND WINDOW SYSTEM

(75) Inventors: Stefan Kölzer, Blankenrath (DE); Alfred Meeth, Piesport (DE)

(73) Assignee: Unilux Ag, Salmtal (DE)

( * ) Notice: Subject to any disclaimer, the term of this patent is extended or adjusted under 35 U.S.C. 154(b) by 486 days.

(21) Appl. No.: 12/672,546

(22) PCT Filed: Aug. 6, 2008

(86) PCT No.: PCT/EP2008/006464
§ 371 (c)(1),
(2), (4) Date: Jul. 15, 2011

(87) PCT Pub. No.: WO2009/021662
PCT Pub. Date: Feb. 19, 2009

(65) Prior Publication Data
US 2011/0308180 A1    Dec. 22, 2011

(30) Foreign Application Priority Data

Aug. 10, 2007    (EP) ..................................... 07015820

(51) Int. Cl.
*E04C 2/38*    (2006.01)
(52) U.S. Cl.
USPC .................................... 52/656.5; 52/204.591
(58) Field of Classification Search
USPC ........... 52/204.591, 309.4, 656.5, 783.1, 208, 52/204.5, 204.1, 404.1, 786.1; 49/504; 428/34
See application file for complete search history.

(56) References Cited

U.S. PATENT DOCUMENTS

| | | | | |
|---|---|---|---|---|
| 4,875,316 A | * | 10/1989 | Johnston | 52/204.593 |
| 6,105,320 A | * | 8/2000 | Boor et al. | 52/204.72 |
| 6,427,415 B1 | * | 8/2002 | Rosenkranz | 52/656.5 |
| 2002/0083663 A1 | * | 7/2002 | Ballantyne | 52/204.1 |
| 2007/0160781 A1 | * | 7/2007 | Landon et al. | 428/34 |
| 2010/0018140 A1 | * | 1/2010 | Brunnhofer et al. | 52/204.71 |

FOREIGN PATENT DOCUMENTS

| | | |
|---|---|---|
| DE | 198 43 049 A1 | 5/1999 |
| DE | 299 00 623 U1 | 2/2000 |
| DE | 199 63 000 A1 | 8/2000 |
| DE | 100 60 461 A1 | 3/2002 |
| DE | 100 58 639 A1 | 6/2002 |
| DE | 202 08 153 U1 | 10/2002 |
| DE | 20 2004 004876 U1 | 6/2004 |

OTHER PUBLICATIONS

International Search Report for Appln. No. PCT/EP2008/006464 completed Oct. 30, 2008.

* cited by examiner

*Primary Examiner* — Brian Glessner
*Assistant Examiner* — Paola Agudelo
(74) *Attorney, Agent, or Firm* — Carter, DeLuca, Farrell & Schmidt, LLP

(57) ABSTRACT

The present invention relates to a casement (1) for a glass window or a glass door, a frame and a window system containing a casement and a frame. The casement comprises an insulation material layer arrangement which is located between two wooden profile-members (3, 4). The insulation material layer arrangement has at least a first insulation layer (5) which is constructed for a high level of strength, and at least a second insulation layer (6) which is constructed for a high level of thermal insulation. Between the two wooden profile-members (3, 4), a lateral insulation layer (8) which is constructed for a high level of thermal insulation is arranged substantially perpendicularly relative to the extension direction of the insulation material layer arrangement.

19 Claims, 4 Drawing Sheets

Wood

Insulation Material A

Insulation Material B

CASEMENT FOR A GLASS WINDOW OR LEAF FOR A GLASS DOOR, WINDOW OR DOOR FRAME AND WINDOW SYSTEM

The present invention relates to a casement for a glass window, or leaf for a glass door, a window or door frame and a window system.

A plurality of constructions for casements, so-called scantlings, and frames are known. Since glass windows and glass doors constitute a high proportion of the outer surface in modern constructions, there are high demands in terms of their thermal insulation for casements, frames, glass windows and glass doors. In particular, it is desirable for the frames, casements, glass windows and glass doors to have a low heat transfer coefficient or thermal insulation value U (previously k-value).

Wood/aluminium window systems are known in which insulation materials are fitted below the aluminium cover of the casement. However, such casements have the disadvantage that the aluminium frame with the insulation material therebehind can be removed from the casement only with difficulty or not at all. The aluminium frame is often adhesively-bonded to the casement. Consequently, it is not possible to clean the casement on the inner side or to replace a defective glass pane.

In addition, it is desirable with new windows to maximise the glass surface-area of the window. With a predetermined sizing of the window frame, for example, during installation in an old building, the casement must consequently be constructed with the smallest possible cross-section. Owing to the sizing of the casement which must be kept as small as possible, known casements are optimised only with respect to a low heat transfer coefficient. Owing to the requirement for a high level of thermal insulation which is considered to be more important, however, such known casements do not have the desired stability. The same problem exists with frames.

The specification DE 198 43 049 A1 discloses a casement having a three-layer coating layer arrangement. Between a triple thermal insulation glazing and the thermal layer arrangement, spacers are arranged for retaining the glazing in the casement.

The specification DE 100 58 639 A1 discloses a casement having a sandwich layer arrangement. Between the sandwich layer arrangement and a multi-layer window pane, there is arranged a glass retaining strip comprising a cork layer for retaining the multi-layer window pane. Owing to the cork layer, the formation of cold bridges is reduced.

Accordingly, an object of the present invention is to provide a window frame for a glass window or a glass door and a frame which are optimised in terms of the thermal insulation and stability.

This object is achieved with a casement for a glass window or a glass door having the features of claim 1 and a frame having the features of claim 17.

The casement according to the invention for a glass window or a glass door comprises an insulation material layer arrangement which is located between two wooden profile-members. The insulation material layer arrangement has at least a first insulation layer which is constructed for a high level of strength and at least a second insulation layer which is constructed for a high level of thermal insulation. Between the two wooden profile-members, there extends in a substantially perpendicular manner relative to the extension direction of the insulation material layer arrangement a lateral insulation layer which is constructed for a high level of thermal insulation.

The casement according to the invention has the advantage that the insulation material layer arrangement together with the lateral insulation layer permits a low heat transfer coefficient. In addition, the lateral insulation layer and the provision of insulation materials with different constructions in particular allow a high level of strength for the casement. Furthermore, owing to the compact construction, the structure of the casement according to the invention allows a window system to be provided with a smaller structural height, that is to say, slim profiles. Such window systems with small structural height and a high level of thermal insulation and at the same time a high level of frame strength are desired in particular for windows which are installed in old buildings, since in such old buildings the original window size is generally small and consequently the size of the window glass is intended to be maximised. Owing to the casement according to the invention, these requirements are met. The casement according to the invention can also advantageously be used in thermally-insulated new buildings.

Furthermore, the structure according to the invention for the casement can be used in a structural element which can be installed. This has the advantage that no semi-finished product is used which must still be assembled before installation in the building.

Furthermore, owing to the structure of the casement according to the invention, standard sizes of casements according to the invention can be produced with the window glass surface-area being maximised, optimised thermal insulation and optimised strength. Owing to the fact that the optimised casement still has standard sizes, it is compatible, with no structural changes, with commercially available accessory and equipment ranges, for example, roller shutters or sun-protection systems.

An additional advantage is that the casement, with a high level of thermal insulation and strength, is not heavier than known casements. Window fitters have to be able to readily install the windows in buildings. During fitting, the weight of the window is significant for the duration of the installation in the building. Owing to the weight of the casement, which is kept low according to the invention, it is possible to dispense with the use of transport or retention machines when the window is installed. Furthermore, high transport costs are not involved.

In an advantageous configuration of the present invention, the insulation material layer arrangement has a third insulation layer which is constructed for a high level of strength, the second insulation layer being located between the first and third insulation layer. Such a third insulation layer, which is constructed for a high level of strength, confers additional stability on the casement. Tests and measurements have shown that in particular the combination of an insulation material layer arrangement with two external insulation layers which are constructed for a high level of strength, a second intermediate insulation layer which is constructed for a high level of thermal insulation and a laterally arranged additional insulation layer which is constructed for a high level of thermal insulation, provide an optimum combination of thermal insulation and strength.

Preferably, the third insulation layer is inserted in a groove in one of the two wooden profile-members. Owing to the provision of a groove in one of the two external wooden profile-members, the third insulation layer and consequently the entire insulation material layer arrangement can be fixed in the casement in a stable manner. This provides an additional advantage with regard to the stability of the casement according to the invention.

According to a preferred configuration of the present invention, the lateral insulation layer abuts at least the first and second or the second and third insulation layer and covers at least one of the lateral seam locations between the first and second or the second and third insulation layer. The lateral insulation layer is consequently arranged along the seam locations, that is to say, the connection locations of the individual layers of the sandwich structure of the insulation material layer arrangement. The connection locations between the individual layers of the insulation material layer arrangement are the weakest locations with respect to thermal insulation and strength. Owing to the arrangement of the lateral insulation layer at these connection locations, the thermal insulation and strength is increased at the connection locations and consequently in the entire arrangement. Consequently, the lateral insulation layer provides, on the one hand, increased strength and, on the other hand, increased thermal insulation. Furthermore, the covering of the seam locations also prevents moisture and insects from entering the seam locations.

In order to further increase the stability and thermal insulation of the structure according to the invention, the lateral insulation layer and the insulation layers of the insulation material layer arrangement are preferably adhesively-bonded by means of an adhesive-bonding agent. The adhesive-bonding agent is preferably a single-component polyurethane adhesive and/or a dual-component PVAC adhesive which is also known as casein glue.

According to a preferred configuration of the present invention, the lateral insulation layer is arranged between the glazing of the glass window or the glass door and the insulation material layer arrangement. The lateral insulation layer, in the state installed in the casement, consequently provides thermal insulation between the outer space and the inner space. In particular, the lateral insulation layer covers the lateral seam locations of the insulation material layer arrangement which are directed outwards when the window is in the closed state and consequently provides advantageous thermal insulation.

According to a development of the present invention, spacer elements are arranged between the lateral insulation layer and the glazing of the glass window or the glass door. These spacer elements confer additional strength on the casement construction. It is also possible to adhesively-bond the panes. This provides additional stability since the panes also take care of statics.

Also in a preferred manner, the insulation layers of the insulation material layer arrangement are adhesively-bonded to each other by means of an adhesive-bonding agent. The adhesive-bonding agent may again preferably be a single-component polyurethane adhesive-bonding agent and/or a dual-component PVAC adhesive-bonding agent which is also known as casein glue.

In order to be able to produce the casement in a more simple manner, the insulation material layer arrangement is at least partially covered by a third wooden profile-member at the side thereof facing the lateral insulation layer. Also in a preferred manner, the casement has been machined during production with a milling cutter, at least at those locations at which it has a wood covering. In principle, a wood covering has the advantage that a desired external shape of the casement can be produced in a more simple manner than, for example, in the case of a plastics covering. This is substantiated by the fact that wood can be more readily machined and shaped than plastics material or insulation material. In order to machine the wood covering, for example, with a milling cutter, it is further possible to use more simple, that is to say, more cost-effective, tools than are used when plastics material is being processed. This reduces the production costs.

Furthermore, milling away parts of the wood covering also requires only a shorter time than processing plastics material. This provides an additional advantage in terms of cost for producing the casement according to the invention compared with known casement structures. The present invention is not limited to machining wood by means of milling. In principle, any type of wood machining can be used which forms the wooden profile-members into the desired shape.

According to a development of the present invention, the third insulation layer has, at the side thereof facing the lateral insulation layer, a groove in which window fittings are arranged, the window fittings being outwardly covered by a closure plate. Owing to the arrangement of the window fittings in a groove of the third insulation layer, a compact construction of the casement is allowed. The closure plate retains the window fittings in the groove.

According to another preferred configuration of the present invention, the casement further has a removable aluminium frame which, when the glass window or glass door is closed, provides an outer covering of the region between the glazing and the aluminium frame of the window frame which is associated with the casement by means of two sealing elements. According to this preferred configuration, a wood/aluminium casement is proposed in which the aluminium frame which is exposed to constant weathering can readily be removed and replaced. To this end, there is preferably arranged below the aluminium frame a rotary connector which engages in the external wooden profile-member. By rotating the rotary connector, the aluminium frame can be released and removed from the casement. It is thereby readily possible to clean the casement and/or replace tarnished window panes. The present invention is not limited to connection using a rotary connector. In principle, any fixing mechanism which allows the aluminium frame to be removed can be used.

According to another preferred configuration of the present invention, the wooden profile-member which abuts the first insulation layer has a drip edge. The drip edge advantageously allows water to drain from the casement. Optimal drainage of water from the glazing is thereby provided.

With regard to the insulation layers, the first and third insulation layer may comprise a high-pressure-resistant polyurethane hard foam having a mass density of from 400 $kg/m^3$ to 600 $kg/m^3$ and the second insulation layer and the lateral insulation layer may comprise a polyurethane hard foam having a mass density of from 60 $kg/m^3$ to 200 $kg/m^3$. Preferably, the first and third insulation layer comprise a high-pressure-resistant polyurethane hard foam having a mass density of approximately 450 $kg/m^3$ and the second insulation layer and the lateral insulation layer comprise a polyurethane hard foam having a mass density of approximately 80 $kg/m^3$. Tests have shown that a polyurethane hard foam having a mass density of approximately 450 $kg/m^3$ confers optimum strength on the casement and a polyurethane hard foam having a mass density of approximately 80 $kg/m^3$ allows optimum thermal insulation with a low U value. However, these mass density indications are not limited precisely to the values stated. As can be seen by the person skilled in the art, slight deviations are possible within the scope of the invention.

With regard to the geometry of the insulation layers, the first insulation layer preferably has a layer depth of approximately 11 mm, the second insulation layer has a layer depth of approximately 7.5 mm, the third insulation layer has a layer depth of approximately 18.5 mm and the lateral insulation layer a layer depth of approximately 11 mm. Also in a preferred manner, the first, second and third insulation layer has a layer width of approximately 30 mm or 65 mm and the lateral insulation layer has a layer width of approximately 37 mm or 33 mm. Owing to these geometric dimensions of the insulation layers, it is possible for the insulation layer arrangement to be able to be accommodated in a standard window with the maximum window glass size, that is to say, with a minimum dimension of the casement, with a high level of strength and good thermal insulation being provided. As can be seen by the person skilled in the art, slight deviations are possible within the scope of the invention.

In addition to the good thermal insulation and high level of strength, the structure of the casement according to the invention allows effective drainage of water from the glazing. Furthermore, there is protection against insects entering the insulation layers. In known casements, bores or holes directed towards the outer side are necessary for the drainage of water, through which insects enter the casement and can destroy the insulation layers over a number of years. For the drainage of water from the casement according to the invention, no holes are required in the insulation layers which allows good rear ventilation. Furthermore, the aluminium frame is secured to the window frame without any adhesive-bonding agent so that the window glass can be readily replaced. The aluminium frame is securely fixed to the casement and remains able to be freely constructed. For example, corner connection pieces can readily be fitted to the aluminium frame.

The present invention further relates to a frame for a window system having a casement, having an insulation material layer arrangement which is located between two wooden profile-members, the insulation material layer arrangement having at least a first insulation layer which is constructed for a high level of strength, at least a second insulation layer which is constructed for a high level of thermal insulation and at least a third insulation layer which is constructed for a high level of strength, the second insulation layer being located between the first and third insulation layer.

The present invention further relates to a window system having a frame according to the invention and an associated casement according to the invention.

The invention is explained below by way of example with reference to the appended Figures, in which.

The same reference numerals are used in the drawings for elements which are the same.

Figure 1:
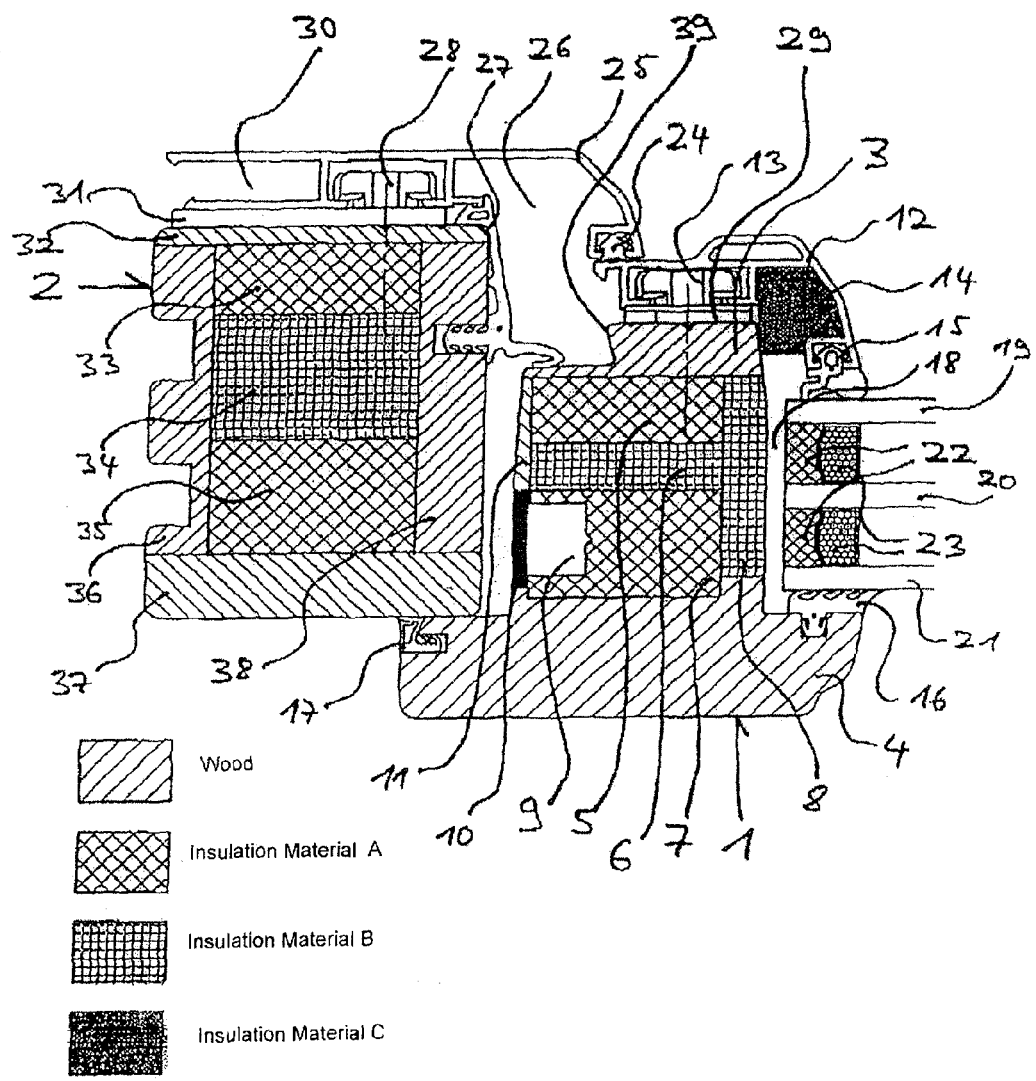
FIG. 1 is a sectioned view of a window according to the invention comprising a casement and a window frame.

FIG. 1 illustrates an exemplary configuration of a window according to the invention. The window comprises a casement 1 and a window frame 2. The casement 1 according to the invention for a glass window or a glass door comprises a wooden profile-member 3 which is arranged at the outer side when the window is closed and a wooden profile-member 4 which is directed towards the inner space. The wood is preferably a softwood. Hardwood can also be used. Between the two wooden profile-members 3 and 4 there is arranged an insulation material layer arrangement containing a first insulation layer 5, a second insulation layer 6 and a third insulation layer 7. Laterally beside the insulation material layer arrangement 5, 6, 7, a lateral insulation layer 8 is arranged between the insulation material layer arrangement 5, 6, 7 and the three window glasses 19, 20, 21. The present invention is not limited to three window glasses. It is also conceivable to use two window glasses. The first insulation layer 5 and third insulation layer 7 comprise an insulation material A which is constructed for a high level of strength. The second insulation layer 7 and the lateral insulation layer 8 comprise an insulation material B which is constructed for a high level of thermal insulation. The three insulation layers 5, 6, 7 are adhesively-bonded to each other using an adhesive-bonding agent. The lateral insulation layer 8 is also fitted to the lateral face of the first insulation layer 5, the lateral face of the second insulation layer 6 and parts of the lateral face of the third insulation layer 7 by means of an adhesive-bonding agent. As can be seen from FIG. 1, the lateral insulation layer 8 covers the connection locations between the first insulation layer 5 and second insulation layer 6 or second insulation layer 6 and third insulation layer 7. The weakest locations of the insulation material layer arrangement 5, 6, 7 with respect to thermal insulation and strength are thereby covered by the lateral insulation layer 8.

The wooden profile-member 3 is connected to the first insulation layer 5 and the lateral insulation layer 8 by means of an adhesive-bonding agent. The wooden profile-member 3 further has a drip edge 39 for drainage of water. The wooden profile-member 4 is also connected to the third insulation layer 7 and the lateral insulation layer 8 by means of an adhesive-bonding agent. Additionally, the wooden profile-member 4 has a groove in which the third insulation layer 7 is retained. This provides additional stability for the arrangement. At the side facing the lateral profile-member 8, the insulation material layer arrangement 5, 6, 7 has an additional wooden profile-member 11. This wooden-profile-member 11 is fixed to the first insulation layer 5 and the second insulation layer 6 by means of an adhesive-bonding agent. In the third insulation layer 7 is a groove in which window fittings 9 are retained. The groove and the window fittings 9 are covered by a closure plate 10.

In the intermediate space 18 between the lateral insulation layer 8 and the window glasses 19, 20, 21 are two spacer elements (not illustrated). The window glasses 19, 20, 21 have, at the ends thereof, insulation elements 22 and end pieces 23. The window glasses 19, 20, 21 are connected to the lower wooden profile-member 4 by means of a sealing element 16 and to an aluminium frame 12 by means of a sealing element 15. In a free space 14 below the aluminium frame 12 an additional insulation material C is arranged. The aluminium frame 12 is removably connected to the casement 1 by means of a rotary connector 13. The rotary connector 13 engages in the upper wooden profile-member 3 by means of an intermediate element 29. By rotating the rotary connector 13, the aluminium frame 12 can readily be removed from the casement 1. The aluminium frame 12 is not adhesively-bonded to the casement 1.

The window frame 2 is connected to the casement 1 by means of sealing elements 17, 24, 27. The window frame 2 comprises an insulation material layer arrangement which is surrounded by two wooden profile-members 32 and 37 and which has a first insulation layer 33, a second insulation layer 34 and a third insulation layer 35. The first insulation layer 33 and third insulation layer 35 comprise an insulation material A which is constructed for a high level of strength. The intermediate second insulation layer 34 comprises an insulation material B which is constructed for a high level of thermal insulation. Laterally on the insulation material layer arrangement 33, 34, 35, two wooden profile-members 36 and 38 are arranged. The wooden profile-members 32, 36, 37, 38 and the insulation layers 33, 34, 35 are adhesively-bonded to each other by means of an adhesive-bonding agent. The sealing element 27 is secured in a groove of the wooden profile-member 38 by means of press-bonding. The aluminium frame 25 of the window frame 2 is connected to the wooden profile-member 32 via a spacer element 31 by means of a rotary connector 28. Using the rotary connector 28, the aluminium frame 25 can be readily removed from the window frame 2. Free spaces 26 and 30 are located below the aluminium frame 25. The aluminium frame 25 is not adhesively-bonded to the window frame 2.

As can be seen from FIG. 1, the casement according to the invention has no outwardly directed opening when the window is closed. Consequently, insects are not able to enter the casement and destroy the insulation layers. Consequently, the casement according to the invention is also optimised with respect to a long service life.

Figure 2:
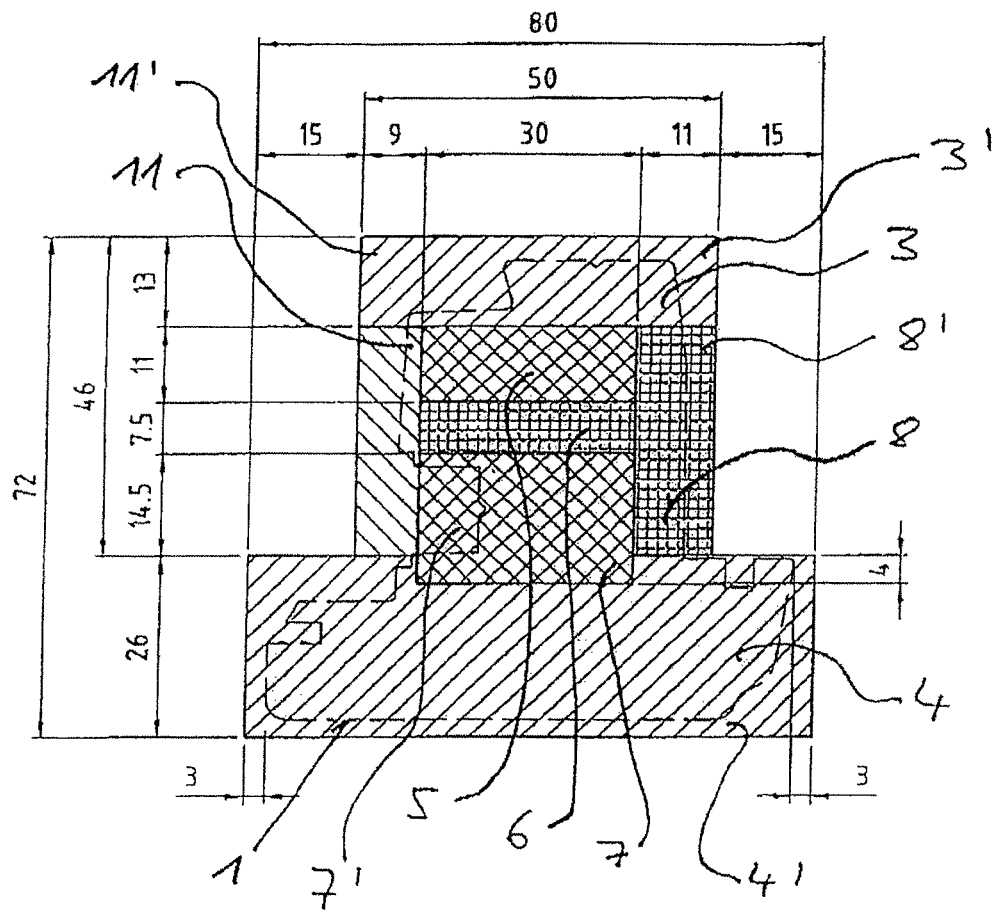
FIG. 2 is a sectioned view of the casement according to the invention in accordance with FIG. 1.
Figure 2:
Figure 2:
Figure 2:

FIG. 2 is a sectioned view of the casement 1 according to FIG. 1. From FIG. 2, the production of the window frame 1 can also be seen. The thick outer lines constitute the unprocessed shape and the thin broken lines the final shape of the casement. In order to produce the casement 1, the insulation layers 5, 6 and 7' are adhesively-bonded to each other by means of an adhesive-bonding agent. Subsequently, the lateral insulation layer 8' is secured laterally to the insulation layers 5, 6 and 7' using an adhesive-bonding agent. Wooden profile-members 3', 11' and 4' are fitted as a covering around parts of the insulation layers 5', 6', 7' and 8'.

In order to produce the final shape of the casement 1, the wooden profile-member 4' is first milled away so that the final shape 4, as illustrated in FIG. 2 by the broken line, remains. As the next step, the wooden profile-member 11' is machined using a milling cutter so that the wooden profile-member 11 is produced. In addition, a groove is formed in the third insulation layer 7' so that the profile of the third insulation layer 7 is produced. As the next step, the lateral insulation layer 8' is machined in such a manner that the profile of the lateral insulation layer 8 is produced. As a final step, the wooden profile-member 3' is machined using a milling cutter so that the wooden profile-member 3 is produced.

Consequently, using a milling cutter, the final profile of the casement can be readily produced. Since most outer profiles comprise wood, it is possible to dispense with costly tools, such as, for example, those which are required for processing plastics material. Owing to the fact that wood can be readily machined, it is possible to produce the casement in a cost-effective and time-optimised manner. In FIG. 2, dimensions of a preferred configuration of a casement are further given in millimetres as the unit of measurement.

Figure 3:
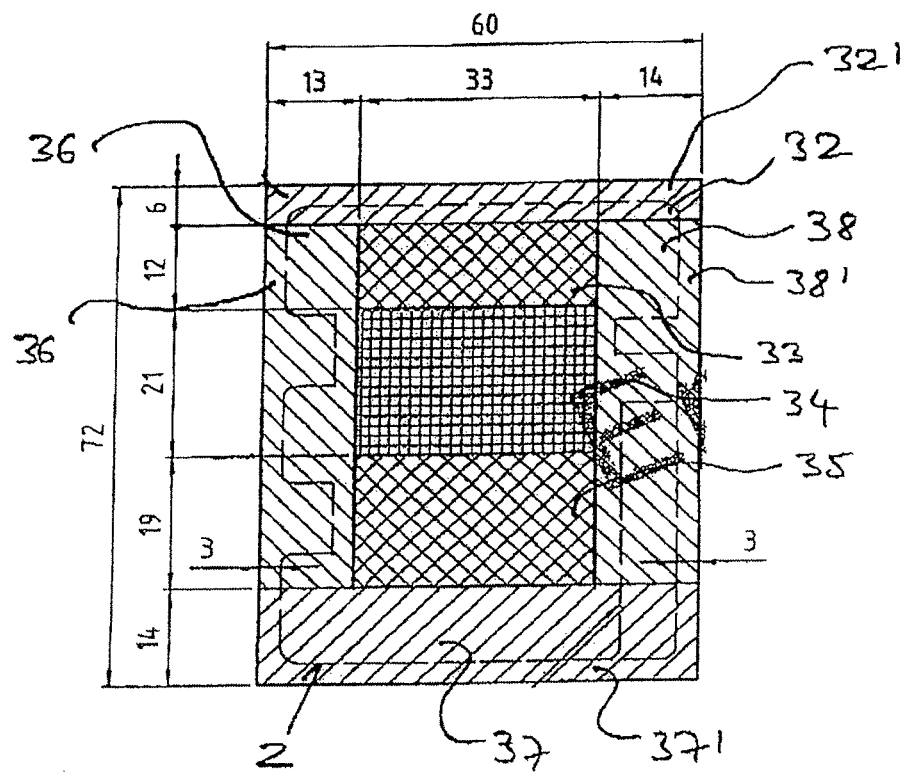
FIG. 3 is a sectioned view of the window frame according to the invention in accordance with FIG. 1.

FIG. 3 is a sectioned view of the window frame 2 according to FIG. 1. The production of the window frame 2 can be seen in FIG. 3. The thick outer lines constitute the unprocessed shape and the thin broken lines the final shape of the window frame. In a similar manner to the casement according to FIG. 2, the three insulation layers 33, 34, 35 are adhesively-bonded to each other in order to produce the window frame 2. The insulation layers 33 and 35 are insulation layers which are constructed for a high level of strength and the insulation layer 34 is an insulation layer which is constructed for a high level of thermal insulation. Subsequently, using an adhesive-bonding agent, wooden profile-members 32', 36', 37', 38' are secured around the insulation material layer arrangement 33, 34, 35. Using a wood milling cutter, the wooden profile-members 32', 36', 37' 38' are formed into the desired shapes 32, 36, 37, 38. In FIG. 3, dimensions of a preferred configuration of a window frame are further given in millimetres as the unit of measurement.

Figure 4:
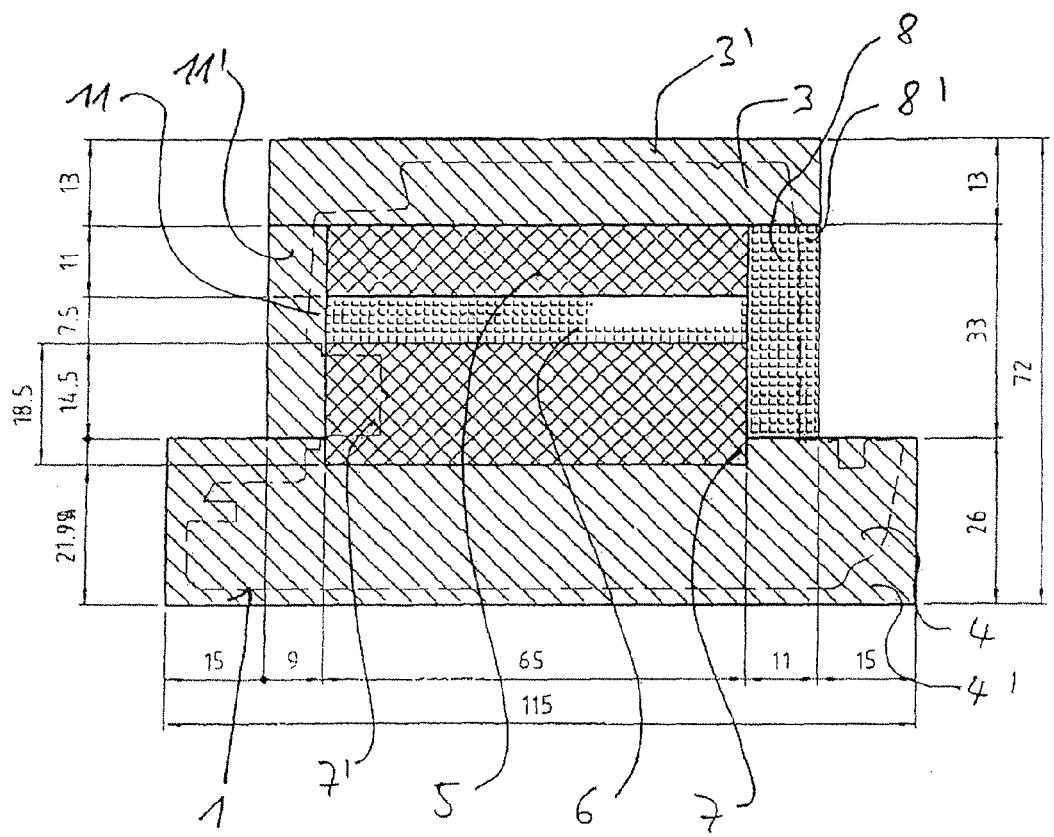
FIG. 4 is a sectioned view of another casement according to the invention in accordance with FIG. 1.

FIG. 4 is an alternative sectioned view of the casement 1 according to FIG. 1. The casement according to FIG. 4 substantially corresponds to the casement according to FIG. 2, the dimensions of the wooden profile-members and the insulation layers being different. The thick outer lines again constitute the unprocessed shape and the thin broken lines the final shape of the casement after machining, for example, with a milling cutter. In FIG. 4, the dimensions of the casement and the wooden profile-members and insulation layers are given in millimetres as the unit of measurement.

As can be seen from FIGS. 2, 3 and 4, the casement 1 and the window frame 2, in particular owing to the wood covering, can be produced in a cost-effective manner since costly machining tools can be dispensed with. The present invention makes it possible to provide a highly thermally insulated window system with frames and scantlings which, in addition to the high level of thermal insulation, have optimised strength.

The invention claimed is:

1. A casement for a glass window or a glass door, comprising:
   an insulation material layer arrangement which is located between two wooden profile-members, the insulation material layer arrangement having:
      at least a first insulation layer which is constructed for a high level of strength; and
      at least a second insulation layer which is constructed for a high level of thermal insulation,
   wherein the casement further includes spacers being arranged between the insulation material layer arrangement and the glass window or the glass door, wherein between the two wooden profile-members, there extends in a substantially perpendicular manner relative to the extension direction of the insulation material layer arrangement an additional lateral insulation layer, which is constructed for a high level of thermal insulation, the additional lateral insulation layer being arranged between the insulation material layer arrangement and the spacers.

2. The casement according to claim 1, wherein the insulation material layer arrangement further includes a third insulation layer which is constructed for a high level of strength, the second insulation layer being located between the first insulation layer and third insulation layer, wherein each of the first, second, and third insulation layers and the lateral insulation layer extend laterally in a width direction and have a layer depth.

3. The casement according to claim 2, wherein the third insulation layer is inserted in a groove of one of the two wooden profile-members.

4. The casement according to claim 2, wherein the lateral insulation layer abuts at least the first and second or the second and third insulation layers and covers at least one of the lateral seam locations between the first and second or the second and third insulation layers.

5. The casement according to claim 2, wherein the third insulation layer includes at a side thereof facing the lateral insulation layer, a groove in which window fittings are arranged, the window fittings being outwardly covered by a closure plate.

6. The casement according to claim 2, wherein the first and third insulation layers include a high-pressure-resistant polyurethane hard foam having a mass density of from about 400 kg/m$^3$ to about 600 kg/m$^3$, and the second insulation layer and the lateral insulation layer include a polyurethane hard foam having a mass density of from about 60 kg/m$^3$ to about 200 kg/m$^3$.

7. The casement according to claim 2, wherein the first insulation layer includes a layer depth of approximately 11 mm, the second insulation layer includes a layer depth of approximately 7.5 mm, the third insulation layer includes a layer depth of approximately 18.5 mm and the lateral insulation layer includes a layer depth of approximately 11 mm.

8. The casement according to claim 2, wherein the first, second and third insulation layers include a layer width of approximately 30 mm and the lateral insulation layers include a layer width of approximately 37 mm.

9. The casement according to claim 2, wherein the first, second and third insulation layers include a layer width of approximately 65 mm and the lateral insulation layer includes a layer width of approximately 33 mm.

10. The casement according to claim 1, wherein the lateral insulation layer and the insulation layers of the insulation material layer arrangement are adhesively-bonded by means of an adhesive-bonding agent.

11. The casement according to claim 1, wherein the lateral insulation layer is arranged between a glazing of the glass window or the glass door and the insulation material layer arrangement.

12. The casement according to claim 1, wherein the spacers are arranged between the lateral insulation layer and a glazing of the glass window or the glass door.

13. The casement according to claim 1, wherein the insulation layers of the insulation material layer arrangement are adhesively-bonded to each other by means of an adhesive-bonding agent.

14. The casement according to claim 1, wherein the insulation material layer arrangement is at least partially covered, at a side thereof facing the lateral insulation layer, by a third wooden profile-member.

15. The casement according to claim 1, wherein the casement is machined during production with a milling cutter, at least at locations having a wood covering.

16. The casement according to claim 1, further comprising a removable aluminium frame which, when the glass window or the glass door is closed, provides an outer covering of the region between a glazing of the glass window or the glass door and an aluminium frame of a window frame, which is associated with the casement by means of two sealing elements.

17. The casement according to claim 1, wherein one of the two wooden profile-members abuts the first insulation layer and includes a drip edge.

18. A frame for a window system including a casement, the frame comprising:
an insulation material layer arrangement which is located between two wooden profile-members, the insulation material layer arrangement having:
at least a first insulation layer which is constructed for a high level of strength;
at least a second insulation layer which is constructed for a high level of thermal insulation; and
at least a third insulation layer which is constructed for a high level of strength, the second insulation layer being located between the first and third insulation layers, wherein the insulation material layer arrangement is covered by the two wooden profile-members and two additional wooden profile-members, the two additional wooden profile-members covering lateral seam locations between the first insulation layer and the second insulation layer and lateral seam locations between the second insulation layer and the third insulation layer.

19. A window system comprising:
a frame including:
an insulation material layer arrangement located between two wooden profile-members, the insulation material layer arrangement having:
at least a first insulation layer constructed for a high level of strength;
at least a second insulation layer constructed for a high level of thermal insulation; and
at least a third insulation layer constructed for a high level of strength, the second insulation layer located between the first and third insulation layers, the insulation material layer arrangement covered by the two wooden profile-members and two additional wooden profile-members covering lateral seam locations between the first insulation layer and the second insulation layer and lateral seam locations between the second insulation layer and the third insulation layer; and
a casement including:
an insulation material layer arrangement located between two wooden profile-members, the insulation material layer arrangement of the casement including:
at least a first insulation layer constructed for a high level of strength; and
at least a second insulation layer which is constructed for a high level of thermal insulation; and
spacers arranged between the insulation material layer arrangement of the casement and a glass window or a glass door, wherein between the two wooden profile-members of the casement, there extends in a substantially perpendicular manner relative to an extension direction of the insulation material layer arrangement of the casement an additional lateral insulation layer, which is constructed for a high level of thermal insulation, the additional lateral insulation layer arranged between the insulation material layer arrangement of the casement and the spacers.

* * * * *